(12) United States Patent
Wright et al.

(10) Patent No.: US 7,325,388 B2
(45) Date of Patent: Feb. 5, 2008

(54) LAWN MOWER WITH DECK LIFT SYSTEM THAT RAISES AND LOWERS DECK WITH RESPECT TO FRAME AND HANDLE CONTROL ASSEMBLY

(75) Inventors: William R. Wright, Clarksburg, MD (US); Glenn T. Hubert, Gaithersburg, MD (US); Luke Waesche, Hagerstown, MD (US); James D. Velke, Germantown, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 182 days.

(21) Appl. No.: 11/214,034

(22) Filed: Aug. 30, 2005

(65) Prior Publication Data

US 2007/0044446 A1    Mar. 1, 2007

(51) Int. Cl.
*A01D 34/00*    (2006.01)
(52) U.S. Cl. ........................................ 56/17.1
(58) Field of Classification Search ................. 56/17.1, 56/11.9, 15.8, 15.2, 14.9
See application file for complete search history.

(56) References Cited

U.S. PATENT DOCUMENTS

| | | | |
|---|---|---|---|
| 4,920,733 A | 5/1990 | Berrios | |
| 5,251,429 A | 10/1993 | Minato et al. | |
| 5,809,755 A * | 9/1998 | Velke et al. | 56/10.8 |
| 5,816,033 A | 10/1998 | Busboom et al. | |
| 5,822,961 A | 10/1998 | Busboom | |
| 5,964,082 A | 10/1999 | Wright et al. | |
| 6,138,446 A | 10/2000 | Velke et al. | |
| 6,189,304 B1 | 2/2001 | Velke et al. | |
| 6,276,486 B1 | 8/2001 | Velke et al. | |
| 6,341,479 B1 | 1/2002 | Scag et al. | |
| 6,390,225 B2 | 5/2002 | Velke et al. | |
| 6,438,930 B1 | 8/2002 | Velke et al. | |
| 6,438,931 B1 | 8/2002 | Velke et al. | |
| 6,490,849 B1 | 12/2002 | Scag et al. | |
| 6,560,952 B2 | 5/2003 | Velke et al. | |
| 6,658,831 B2 | 12/2003 | Velke et al. | |
| 6,688,089 B2 | 2/2004 | Velke et al. | |
| 6,701,825 B1 | 3/2004 | Langenfeld | |
| 6,782,797 B1 | 8/2004 | Brandenburg et al. | |
| 6,837,032 B1 * | 1/2005 | Swartzendruber et al. | ... 56/14.9 |
| 6,912,831 B2 | 7/2005 | Velke et al. | |
| 2001/0001170 A1 | 5/2001 | Velke et al. | |
| 2002/0059788 A1 | 5/2002 | Velke et al. | |
| 2002/0178709 A1 | 12/2002 | Velke et al. | |
| 2005/0126146 A1 | 6/2005 | Velke et al. | |

\* cited by examiner

*Primary Examiner*—Árpád Fábián Kovács
(74) *Attorney, Agent, or Firm*—Nixon & Vanderhye P.C.

(57) ABSTRACT

A lawn mower is provided. In certain example embodiments, the lawn mower includes an improved steering control system/assembly and/or an improved pump control linkage system/assembly. In certain example embodiments, the mower includes an engine deck supporting an engine that drives the at least one blade for cutting grass, the engine deck also supporting a first hydraulic pump that controls the right rear drive wheel and a second hydraulic pump that controls the left rear drive wheel. A deck lift system is for raising/lowering the engine deck relative to both a frame of the mower and a handle control assembly.

15 Claims, 12 Drawing Sheets

LAWN MOWER WITH DECK LIFT SYSTEM THAT RAISES AND LOWERS DECK WITH RESPECT TO FRAME AND HANDLE CONTROL ASSEMBLY

This invention relates to a lawn mower. In certain example embodiments, the lawn mower includes an improved steering control and/or pump control assembly/system.

BACKGROUND OF THE INVENTION

Lawn mowers are known in the art. For example, stand-on mowers are discussed in U.S. Pat. Nos. 6,138,446, 6,390,225, 6,688,089, 6,438,931, 6,189,304, 6,438,930, 6,658,831, 6,560,952, and 5,964,082, the disclosures of all of which are all hereby incorporated herein by reference. Example walk-behind lawn mowers are discussed in U.S. Patent Documents 2005/0126146 and U.S. Pat. No. 4,920,733, the disclosures of which are all hereby incorporated herein by reference. Example mower operable by seated occupants are discussed in U.S. Patent Documents 2001/0001170, 2002/0059788, U.S. Pat. Nos. 6,438,930, 6,438,931, 6,688,089, 6,658,831, and 6,560,952, the disclosures of which are all hereby incorporated herein by reference.

FIGS. 1-4 illustrate an example lawn mower operable by a seated and/or standing occupant, from U.S. Pat. No. 6,688,089, the disclosure of which is incorporated herein by reference. The mower of FIGS. 1-4 is a zero radius turning self-propelled power lawn mower. This mower includes first and second hydro pumps for controlling first and second corresponding wheel motors, so that the first and second rear drive wheels 43 may be driven independently in order to conduct zero radius turns as discussed above. The mower further includes: independently drivable rear drive wheels 43; cutter deck assembly 12 below which the cutting blades cut grass; front caster wheels 37; foot platform 9 for supporting feet of a standing or sitting operator; optional seat 1; gas tank supports 80 for supporting respective gas tanks; battery housing structure 81 for housing a battery 30 and which also functions to help support the seat assembly; steering control levers 33-34 (which work in conjunction with rigid hand grip bar 32) which allow the rear drive wheels 43 to be independently drivable in opposite directions at the same time so as to enable the mower to perform zero radius turns about a vertical zero radius turning axis; vertically extending support plates or weldments 14 which support console 36 and handle grips 32-34; and deck lift lever 82 which allows the cutter deck assembly 12 together with the engine deck 31 (the combustion engine is mounted on the engine deck 31), wherein the engine and cutter decks are raised/lowered together as one unit by the deck lift system in order to adjust the height of the mower cut. Steering control levers 33 and 34 are operatively connected to flexible cables (not shown) which run straight down from the dash area to the pump area of the mower for controlling the pumps associated with the respective steering control levers. The flexible cables do not cross each other, and are flexible to account for the movement of the decks and pumps relative to the steering control levers. With respect to the deck lift system which raises/lower the decks (and the hydro pumps mounted on the engine deck), when deck lift lever 82 is pulled upwardly, the cutter deck assembly 12 together with the engine deck 31 (and engine) is raised so as increase the height of the mower cut. Chain linkage 83 suspends the deck assembly 12 and 31 and permits it to be raised and lowered in accordance with the position of lever 82.

Figure 1:
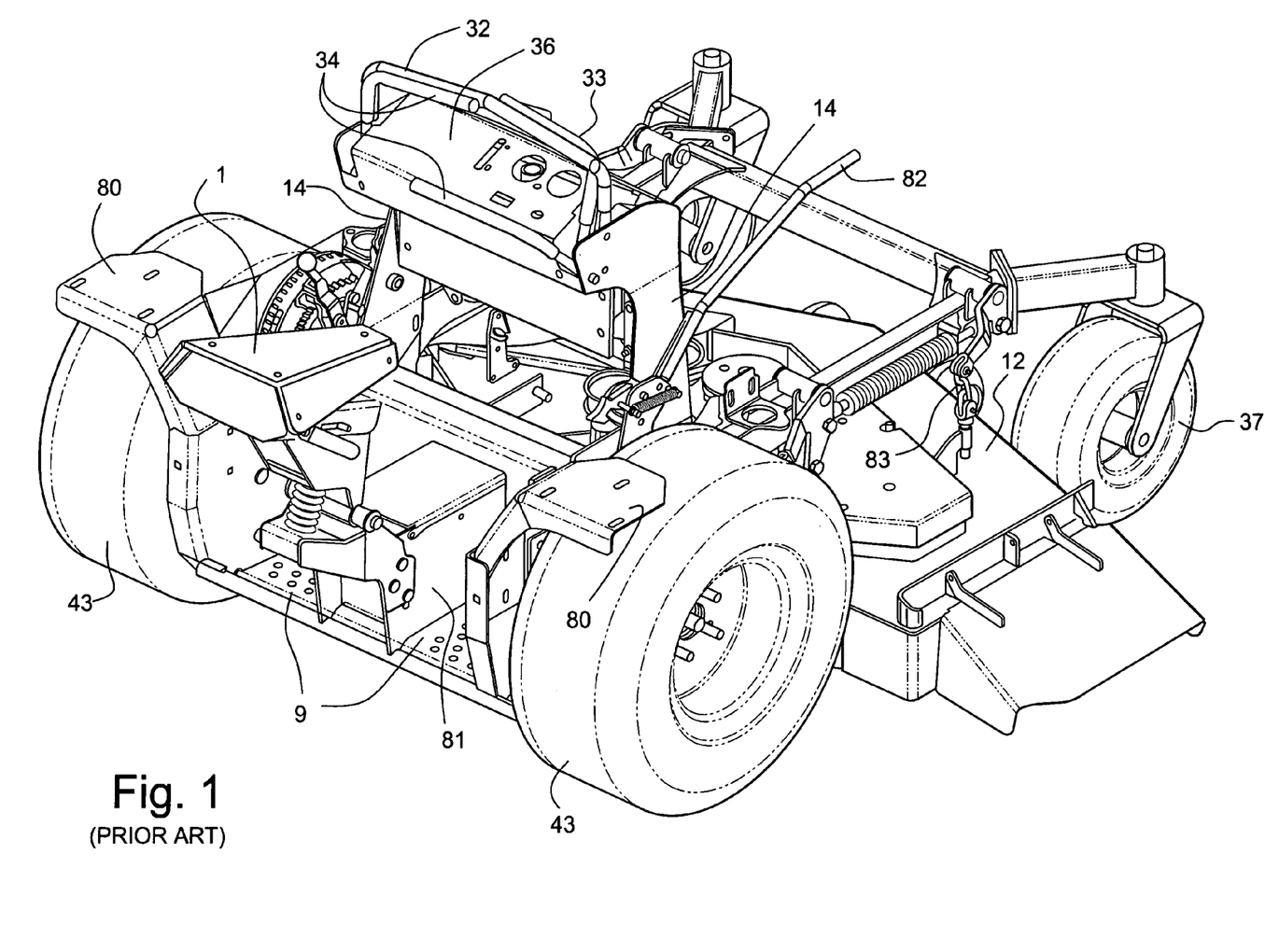
FIG. 1 is a perspective view of a conventional lawn mower including a deck lift system.
Figure 2:
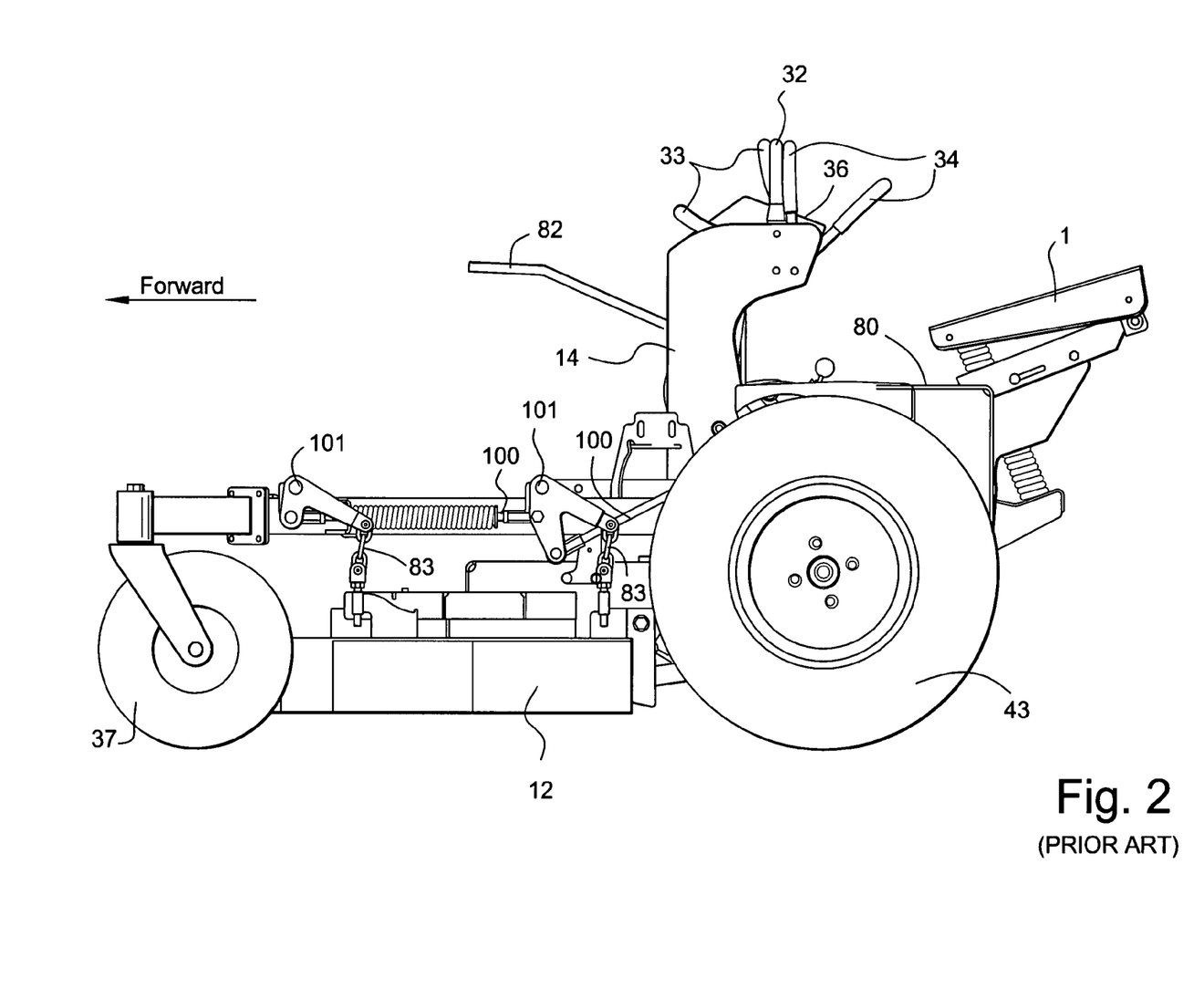
FIG. 2 is a side plan view of the mower of FIG. 1.
Figure 3:
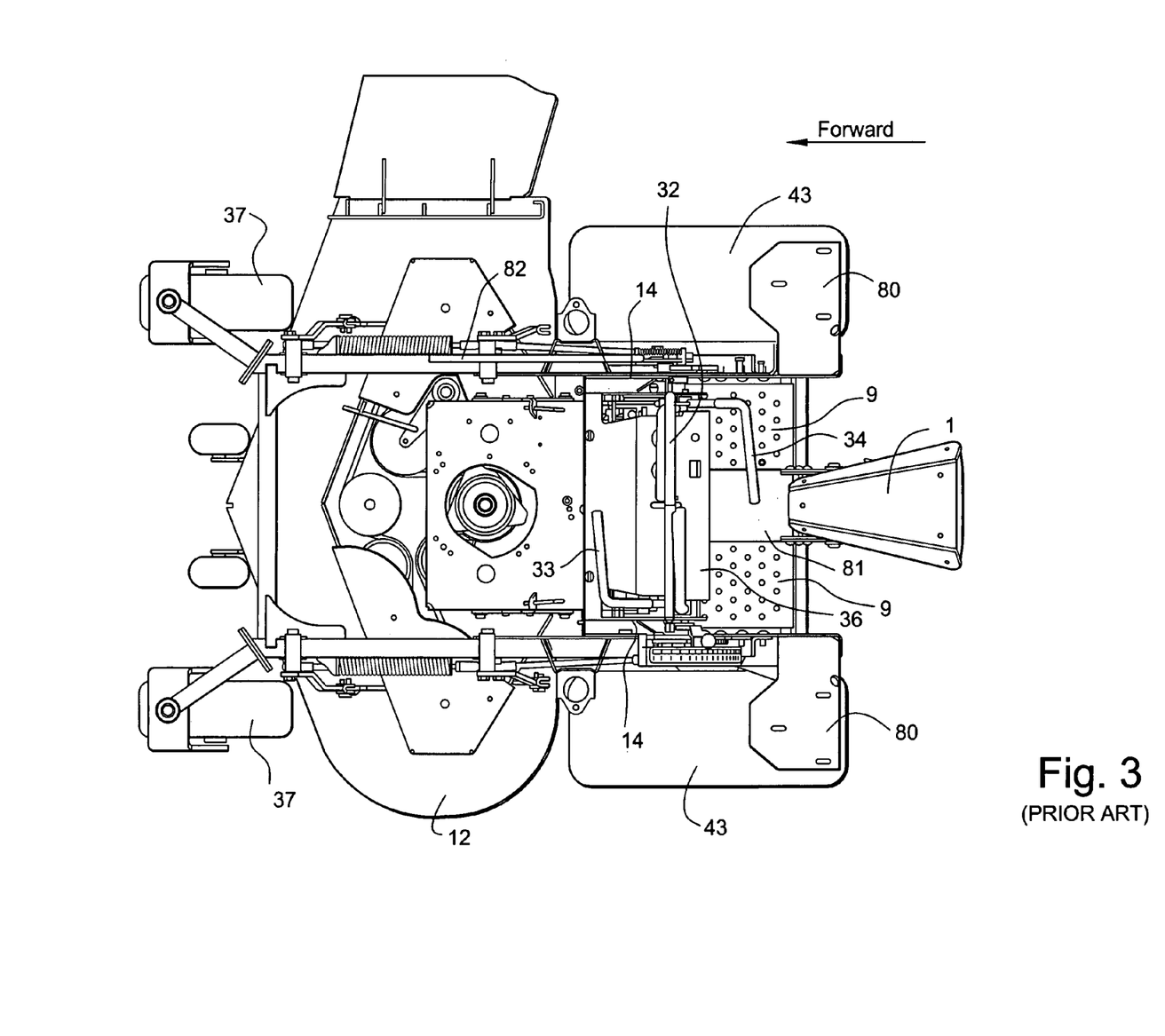
FIG. 3 is a top view of the mower of FIGS. 1-2.
Figure 4:
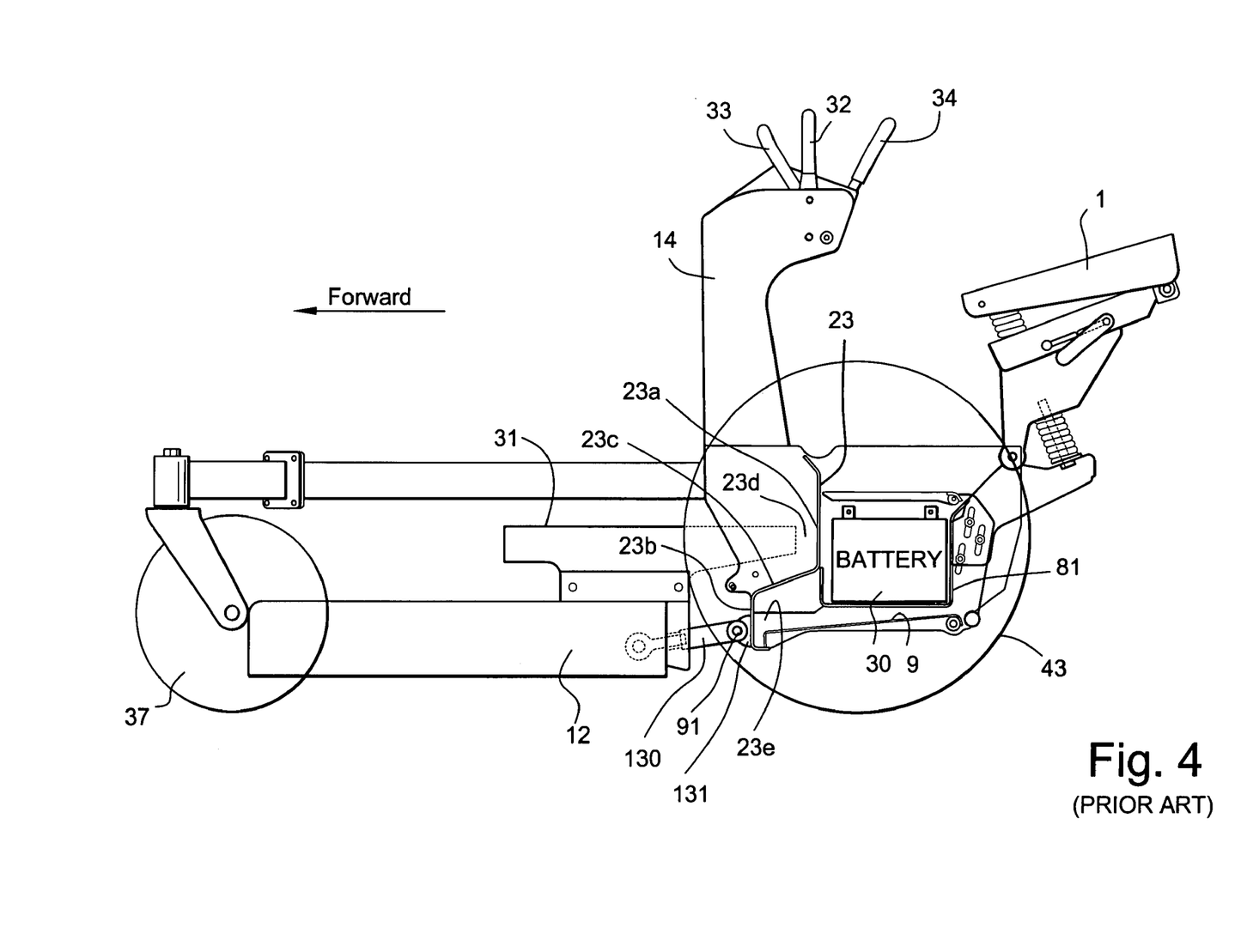
FIG. 4 is a schematic diagram illustrating certain components of the mower of FIGS. 1-3.

When deck lift lever 82 is pulled upwardly in a clockwise pivoting fashion ("clockwise" as defined from the port side of the mower as in FIGS. 2 and 4) by an operator, this causes a deck lift rod (not shown) traversing the mower frame to also rotate in a clockwise direction. This deck lift rod, attached to deck lift rods 100 on either side of the mower, causes rods 100 to be pulled toward the rear of the mower so that lift brackets pivot counterclockwise about pivot axes 101 in order to lift the cutter deck assembly 12 together with the engine deck 31 and engine upwardly via chains 83 in order to raise the cut of the mower. Since the handle grips 32-34 and weldments (or vertically upright support members) 14 are attached to the frame and not the engine or cutter deck(s), the grips 32-34 and upright support members 14 do not move up/down along with the cutter deck assembly 12, engine, and engine deck 31. In a similar manner, when lever 82 is lowered from a locked position, the weight of the deck assemblies and engine causes the illustrated brackets to rotate clockwise ("clockwise" as defined in, for example, FIG. 2) about axes 101 and rods 100 to move in a forward direction so that the cutter deck assembly 12 is lowered along with the engine deck 31 and engine. In this respect, control arms 130 (see FIG. 4) maintain the lateral position of the cutter deck assembly 12 and engine deck 31 (and the engine) during lower/raising by the deck lift system. Control arms pivot about pivot axis 91 during raising and lower of the decks, and tabs 131 are provided for supporting the pivot axis area.

As review of U.S. Pat. No. 6,688,089 will show that the tractor frame (and thus the handle controls and vertical weldments/supports 14 supported thereby) does not move up/down along with the decks. FIG. 4 illustrates that the tractor frame includes cross member or front wall 23 that is shaped so as to include approximately parallel portions 23*a* and 23*b* that are connected by angled portion 23*c*. The presence of angled portion 23*c* enables portions 23*a* and 23*b* to be approximately parallel to one another yet offset from one another thereby creating space 23*d* above angled portion 23*c* where the rear edge of engine deck 31 can move up and down relative to the tractor frame during cutting height adjustment initiated by the deck lift system. In other words, the presence of angled portion 23*c* creates space 23*d* so that the space above the toes of the operator (the toes would be at area 23*e*) may be used for enabling the engine deck to move up/down relative to the frame.

Further details of the mower of FIGS. 1-4 may be found in U.S. Pat. No. 6,688,089, incorporated herein by reference. While the mower of FIGS. 1-4 is excellent in many respects, systems therein may be subject to improvement in certain instances.

BRIEF SUMMARY OF EXAMPLE EMBODIMENTS OF THE INVENTION

This invention relates to a lawn mower. In certain example embodiments, the lawn mower includes an steering control system/assembly.

In certain example embodiments of this invention, there is provided a lawn mower comprising: at least one cutting blade for cutting grass; a right rear drive wheel and a left rear drive wheel; an engine deck supporting an engine that drives the at least one blade for cutting grass, the engine deck also supporting a first hydraulic pump that controls the right rear drive wheel and a second hydraulic pump that controls the left rear drive wheel; a deck lift system for raising/lowering the engine deck relative to both a frame of the mower and a handle control assembly, the handle control assembly for allowing an operator of the mower to steer the mower by controlling the right and left rear drive wheels independent of one another; and wherein the first hydraulic pump that controls the right rear drive wheel is located on a left half portion of the engine deck, and the second hydraulic pump that controls the left rear drive wheel is located on a right half portion of the engine deck. The lawn mower may be a stand-on type mower and/or a riding type mower in different example embodiments of this invention.

In other example embodiments of this invention, there is provided a lawn mower comprising: at least one cutting blade for cutting grass; a right rear drive wheel and a left rear drive wheel; a first hydraulic pump that controls the right rear drive wheel and a second hydraulic pump that controls the left rear drive wheel; and wherein linkage between a right hand control member and the first hydraulic pump includes a first rotatable torsion bar, and linkage between a left hand control member and the second hydraulic pump includes a second rotatable torsion bar, and wherein the first and second torsion bars cross one another so as to form an X when viewed from a rear and/or front of the mower. The shape of the X may vary upon different elevations of the deck caused by the deck lift system in certain example embodiments of this invention.

In still further example embodiments of this invention, there is provided a lawn mower comprising: a right rear drive wheel and a left rear drive wheel; a first hydraulic pump that controls the right rear drive wheel, and a second hydraulic pump that controls the left rear drive wheel; a right hand control members that pivots about an axis and controls speed and direction of the right rear drive wheel via the first hydraulic pump; and wherein pivoting and/or rotation of the right hand control member causes a substantially vertically oriented control rod to move upward and/or downward, wherein movement of the substantially vertically oriented control rod upward and/or downward causes a torsion bar to rotate, the torsion bar forming an angle of from about 10 to 50 degrees relative to the horizontal for at least one location of an engine deck of the mower, and wherein rotation of the torsion bar causes a pump control lever to pivot in a manner to control operation of the first pump that controls the right rear drive wheel.

In still further example embodiments of this invention, there is provided a lawn mower comprising: a right rear drive wheel and a left rear drive wheel; a first hydraulic pump that controls the right rear drive wheel, and a second hydraulic pump that controls the left rear drive wheel; a right hand control members that pivots about an axis and controls speed and direction of the right rear drive wheel via the first hydraulic pump; and wherein pivoting and/or rotation of the right hand control member causes a torsion bar to rotate, the torsion bar forming an angle of from about 10 to 50 degrees relative to the horizontal for at least one elevation of an engine deck of the mower, and wherein rotation of the torsion bar causes a pump control lever to pivot in a manner to control operation of the first pump that controls the right rear drive wheel, and wherein the angle of the torsion bar relative to the horizontal changes as an elevation of an engine deck of the mower changes relative to a frame of the mower. In certain example embodiments, the change in angle of the rotatable torsion bar relative to the horizontal as a function of the elevation of the engine deck is advantageous in that it substantially preserves the effect different positions of the handle control lever(s) have on the pump(s) so as to substantially maintain its range and effect on the speed and direction of the mower.

DETAILED DESCRIPTION OF EXAMPLE EMBODIMENTS OF THE INVENTION

Referring more particularly to the accompanying drawings in which like reference numerals indicate like parts throughout the several views.

Figure 5:
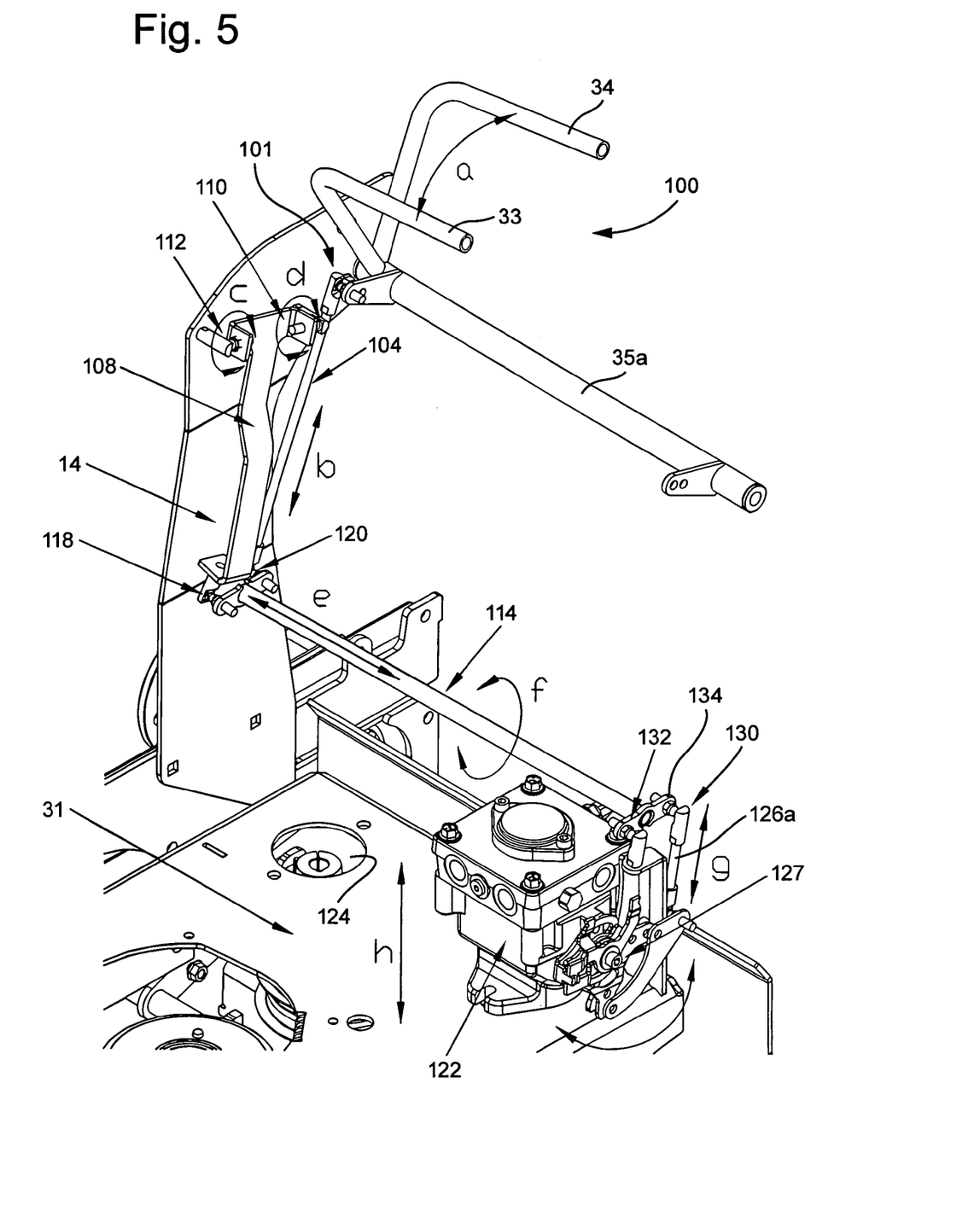
FIG. 5 is a perspective view of components of a steering and/or pump control assembly/system according to an example embodiment of this invention (the system for only the right rear drive wheel control is illustrated in this figure for purposes of simplicity).

The mowers of certain example embodiments of this invention discussed herein may be the same as the mower discussed above with respect to FIGS. 1-4 except for the changes illustrated in the figures herein and/or described herein. As shown in FIGS. 1-4, mowers according to certain example embodiments of this invention are zero radius turning self-propelled power lawn mowers. This mower includes first and second hydro pumps for controlling first and second corresponding wheel motors, so that the first and second rear drive wheels 43 may be driven independently in order to conduct zero radius turns as discussed above. The mower further includes: independently drivable rear drive wheels 43; cutter deck assembly 12 below which the cutting blades cut grass; front caster wheels 37; foot platform 9 for supporting feet of a standing or sitting operator; optional seat 1; gas tank supports 80 for supporting respective gas tanks; battery housing structure 81 for housing a battery 30 and which also functions to help support the seat assembly; steering control levers 33-34 (which work in conjunction with rigid hand grip bar 32) which allow the rear drive wheels 43 to be independently drivable in opposite directions at the same time so as to enable the mower to perform zero radius turns about a vertical zero radius turning axis; vertically extending support plates or weldments 14 which support console/dash 36 and handle grips 32-34; and deck lift lever 82 which allows the cutter deck assembly 12 together with the engine deck 31 (the combustion engine is mounted on the engine deck 31) to be raised/lowered, wherein the engine and cutter decks are raised/lowered together as one unit by the deck lift system in order to adjust the height of the mower cut. With respect to the deck lift system which raises/lower the decks (and the hydro pumps mounted on the engine deck), when deck lift lever 82 is pulled upwardly, the cutter deck assembly 12 together with the engine deck 31 (and engine and hydro pumps) is raised so as increase the height of the mower cut. Direction "h" in FIG. 5 illustrates the direction that the engine deck 31, engine, cutter deck, and pumps move when raised/lowered by the deck lift system. Chain linkage 83 suspends the deck assembly 12 and 31 and permits it to be raised and lowered in accordance with the position of lever 82. The mower and engine decks are raised/lowered relative to the frame of the mower. Thus, the frame of the mower is not raised/lowered with the decks. The frame of the mower includes vertical weldments/supports 14, as well as the tractor frame which includes components 23a, 23b, 23c, 23d and 23e, as well as the vertical sidewalls at the sides of the foot platform (the weldments/supports 14 are attached to the tractor frame). Thus, the vertical weldments/supports 14 and the handle control assembly 32-34 supported by 14 do not go up and down along with the decks when the cut height is changed.

The cutter deck assembly 12 includes a cutter deck below which the grass cutting blades are mounted, a pulley system housing that is covered by a lid to house pulleys and belts for driving the cutting blades. The mower's combustion engine (mounted on engine deck 31 and having a shaft extending through and/or below an aperture defined in the engine deck 31) drives the belts under the cutter deck lid thereby driving the cutting blade(s) of the mower so that grass can be cut.

Figure 6:
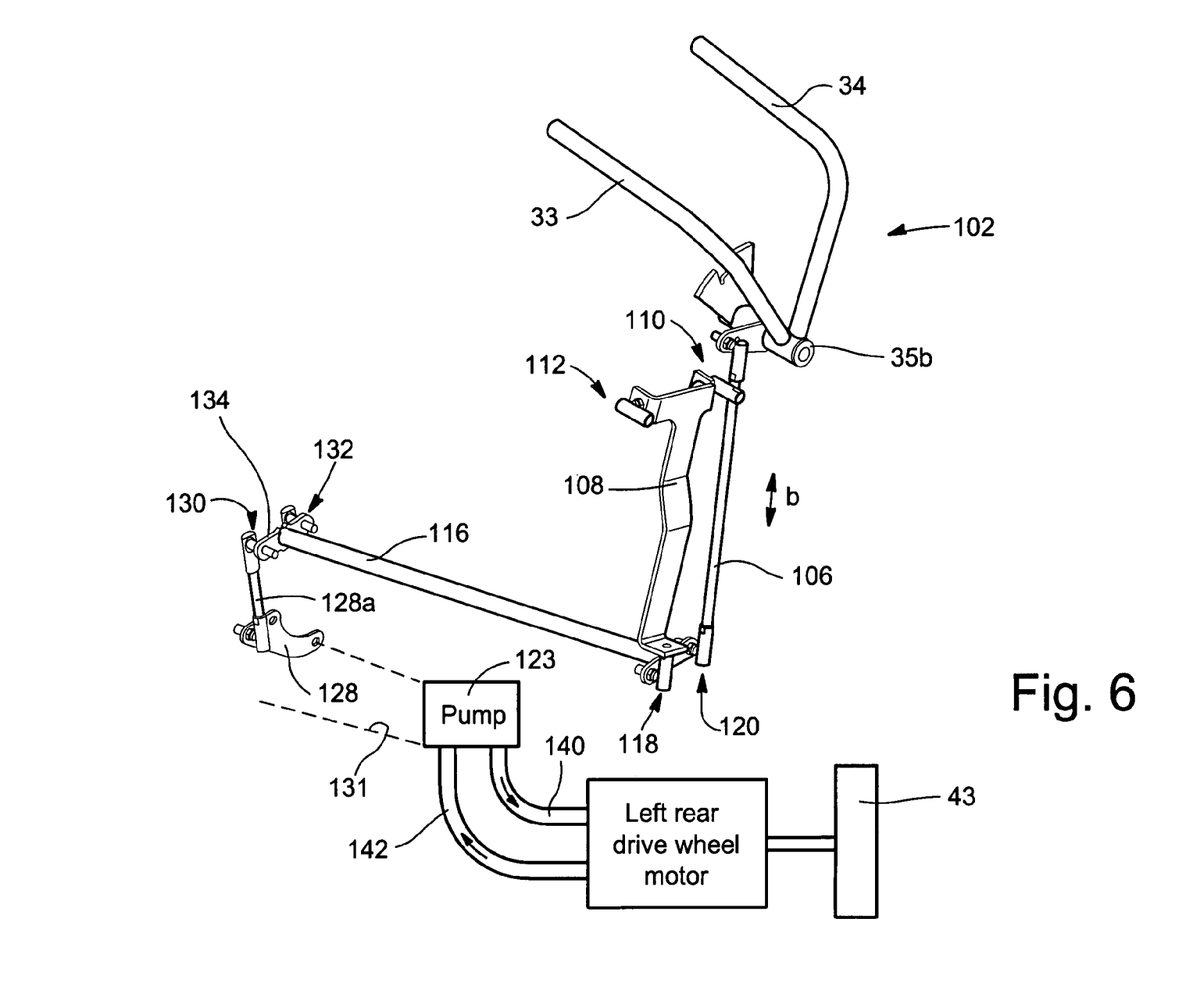
FIG. 6 is a perspective view of certain components of the steering and/or pump control assembly/system (parts for the system for only the left rear drive wheel control are illustrated in FIG. 6 for purposes of simplicity).
Figure 7:
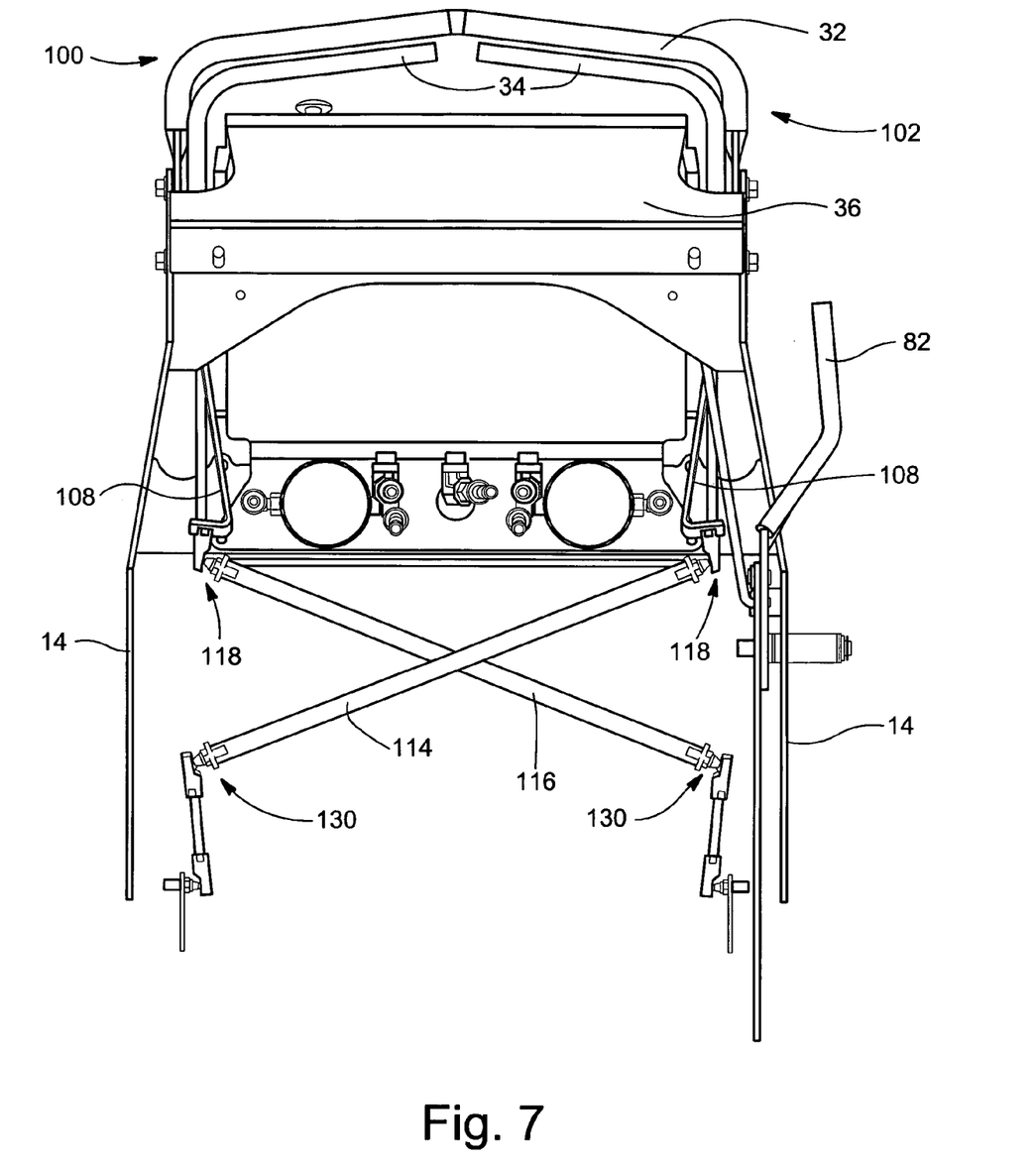
FIG. 7 is a front plan view of certain components of the steering and/or pump control assembly/system of FIGS. 5-6 (this view illustrating the system when the engine deck is in a relatively low position relative to the mower's frame—viewed from the front of the mower).
Figure 8:
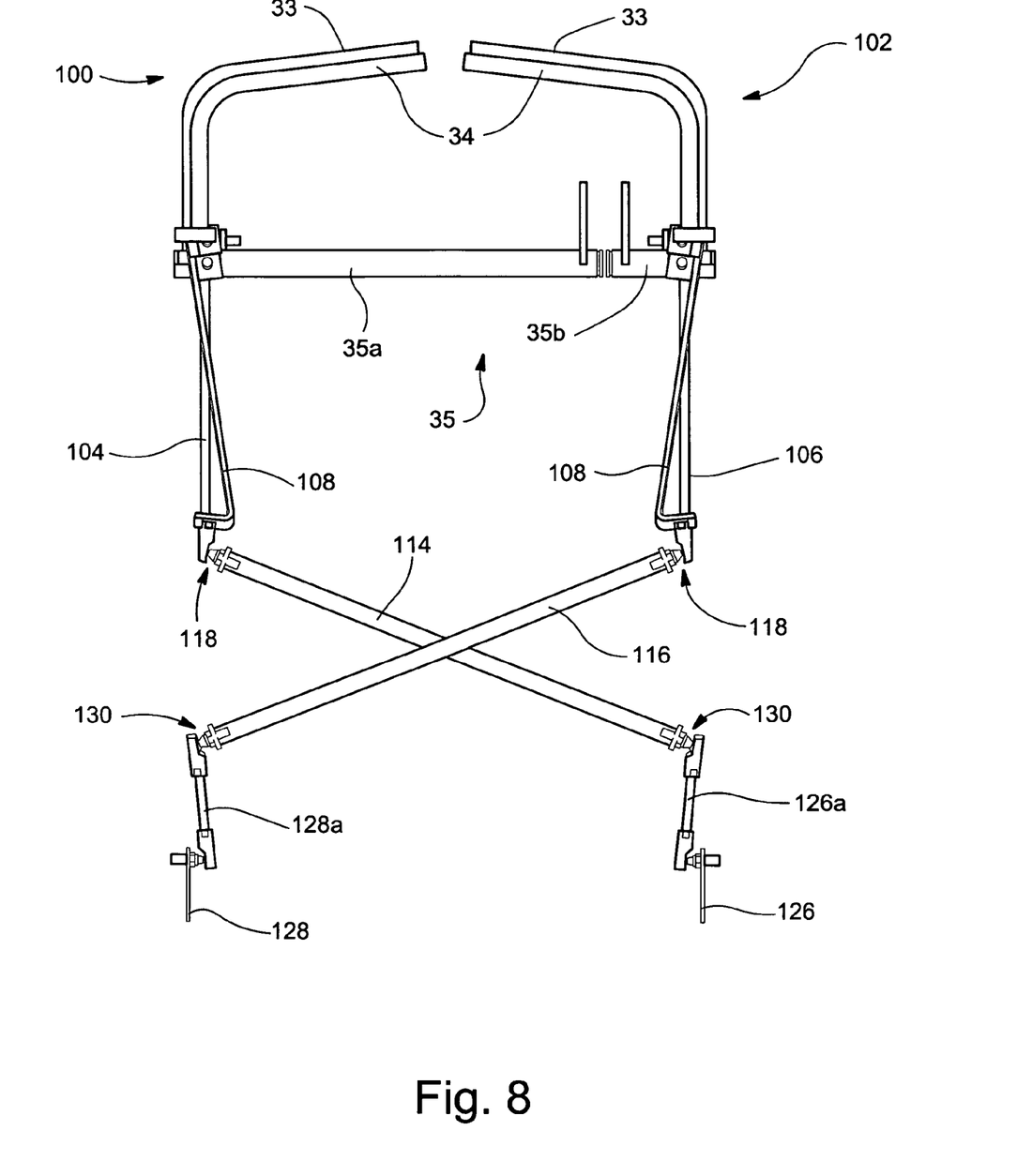
FIG. 8 is a front plan view of certain components of the steering and/or pump control assembly/system of FIGS. 5-7 (this view differs from FIG. 7 in that the dash has been removed to permit more parts to be seen) (this view illustrating the system when the engine deck is in a relatively low position relative to the mower's frame).
Figure 9:
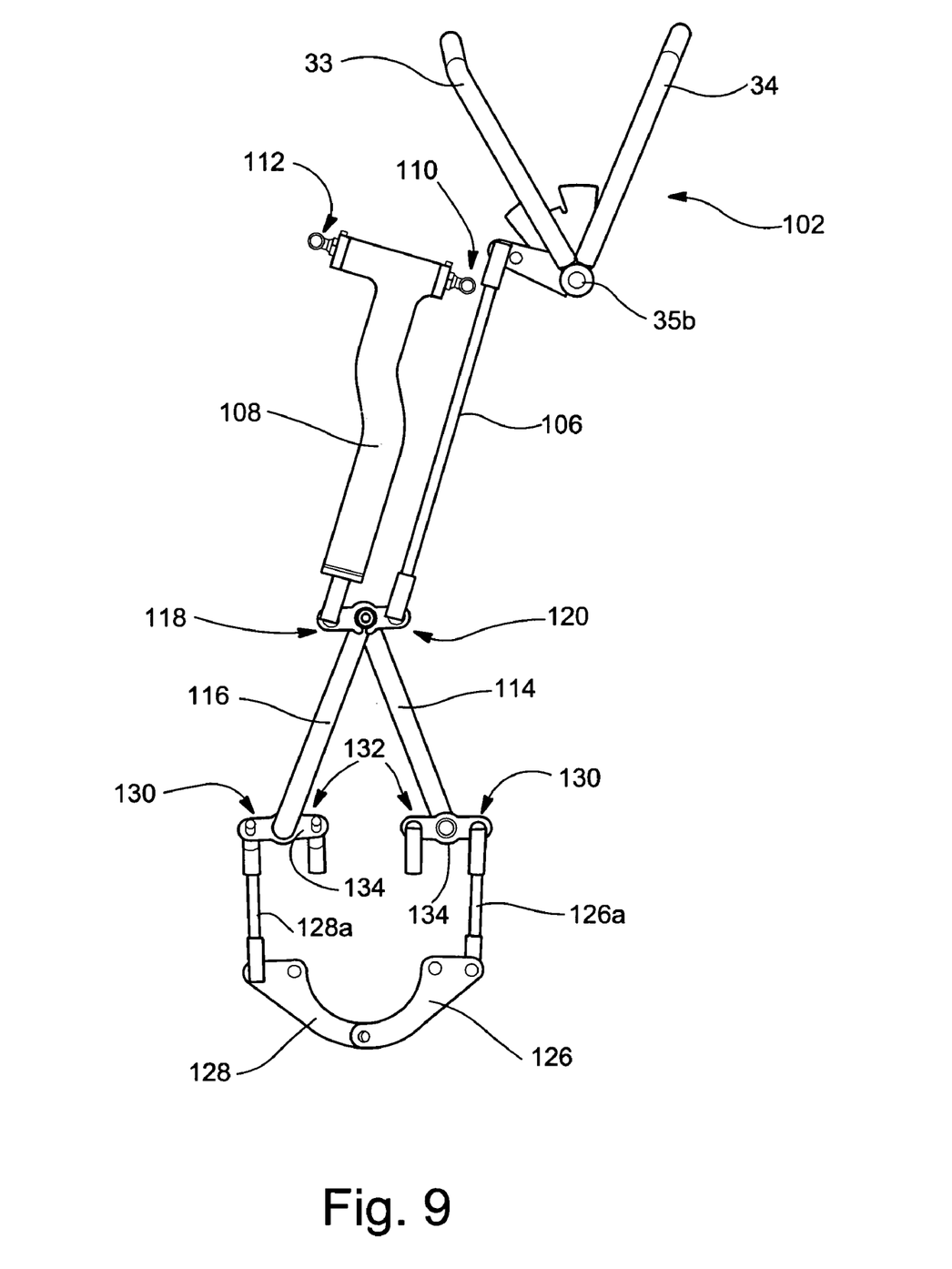
FIG. 9 is a side plan view of certain components of the steering and/or pump control assembly/system of FIGS. 5-8 (this view illustrating the system when the engine deck is in a relatively low position relative to the mower's frame, in the same position as in FIGS. 7-8).
Figure 10:
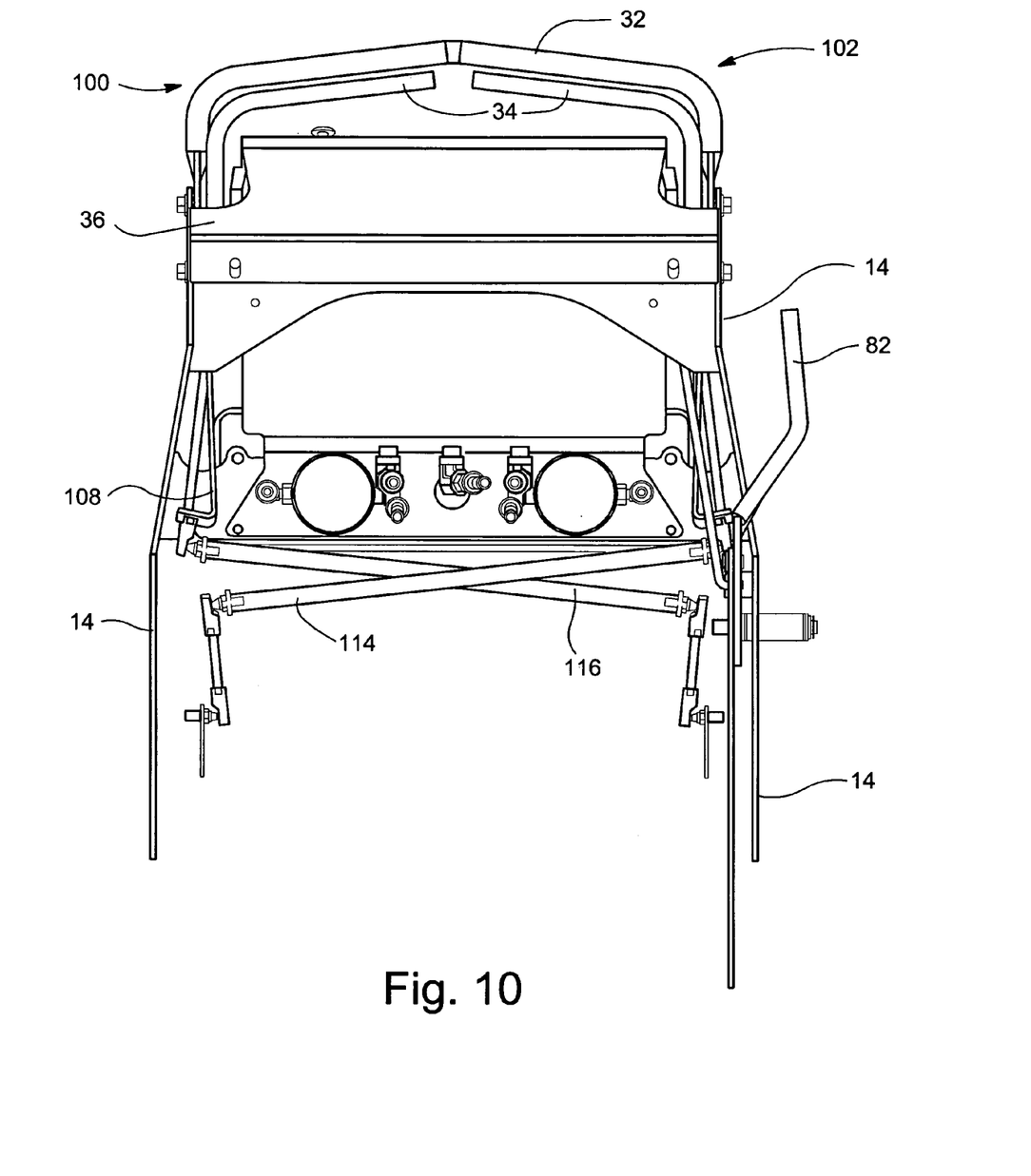
FIG. 10 is a front plan view of certain components of the steering and/or pump control assembly/system of FIGS. 5-9 (this view illustrating the system when the engine deck is in a relatively high position, compared to the engine deck position of FIGS. 7-9, relative to the mower's frame—viewed from the front of the mower).
Figure 11:
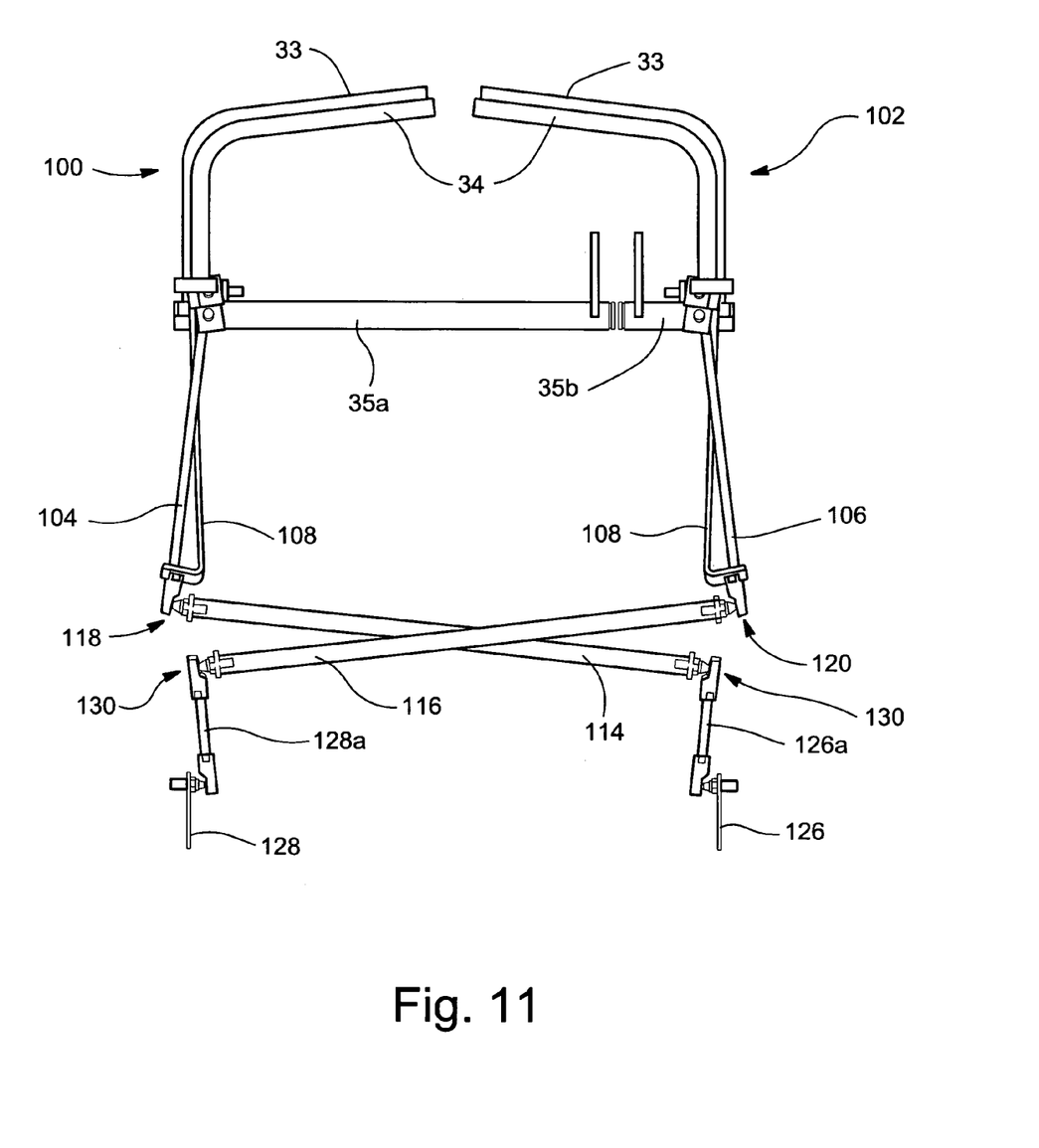
FIG. 11 is a front plan view of certain components of the steering and/or pump control assembly/system of FIGS. 5-10 (this view differs from FIG. 10 in that the dash has been removed to permit more parts to be seen) (this view illustrating the system when the engine deck is in a relatively high position, compared to the engine deck position of FIGS. 7-9, relative to the mower's frame).
Figure 12:
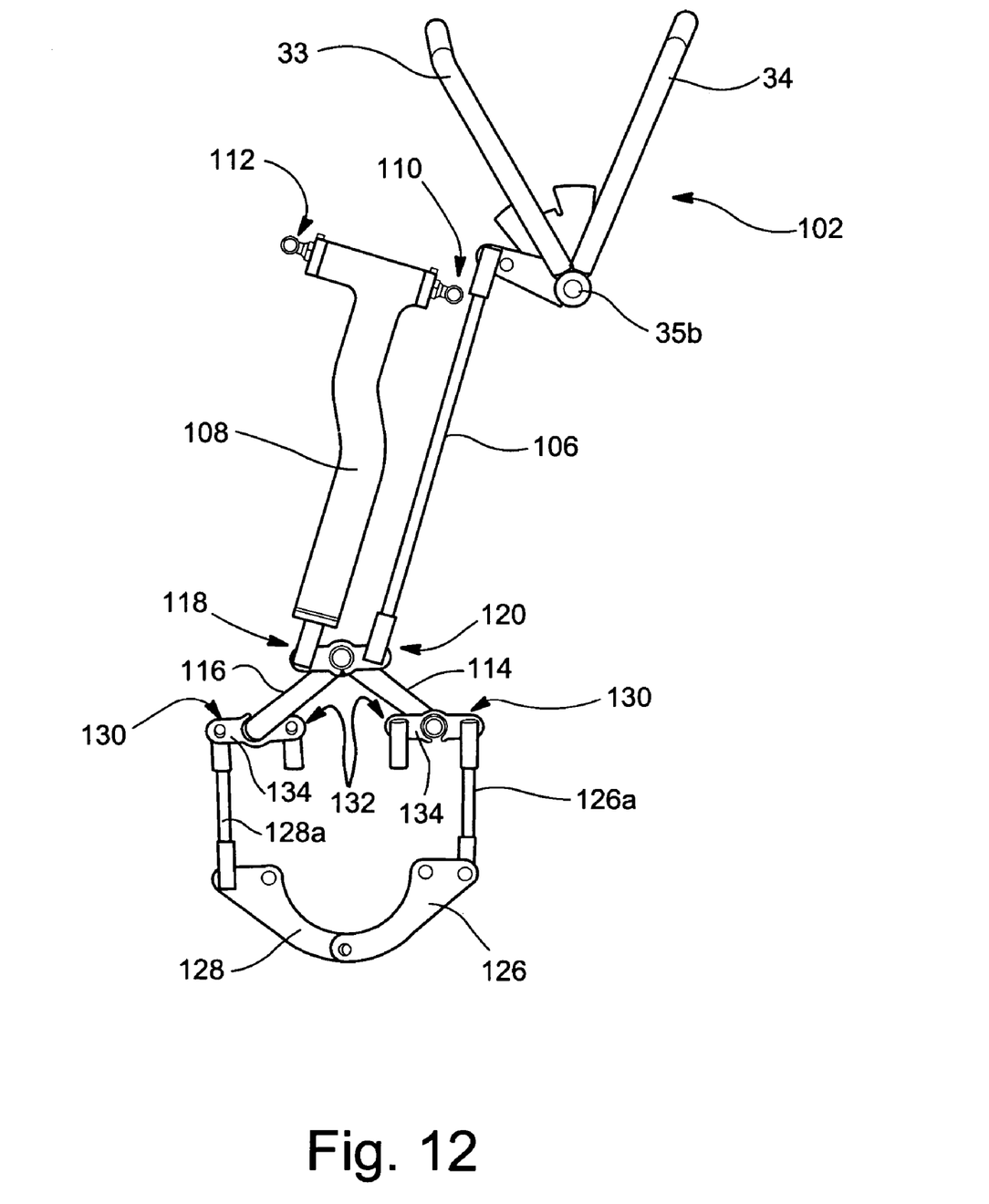
FIG. 12 is a side plan view of certain components of the steering and/or pump control assembly/system of FIGS. 5-11 (this view illustrating the system when the engine deck is in a relatively high position relative to the mower's frame, in the same position as in FIGS. 10-11).

FIGS. 5-12 illustrate an improved handle/pump control system or assembly for use with such a mower according to an example embodiment of this invention. FIG. 5 is a perspective view of components of the steering and/or pump control assembly/system (illustrating the right rear drive wheel control system only for purposes of simplicity), whereas FIG. 6 is a perspective view of certain components of the steering and/or pump control assembly/system (illustrating components of the left rear drive wheel control system only for purposes of simplicity). FIGS. 7-9 are various views of parts of the steering and/or pump control assembly/system when the engine deck is in a relatively low position relative to the mower's frame. FIGS. 10-12 are various views of parts of the steering and/or pump control assembly/system illustrating the system when the engine deck is in a relatively high position, compared to the lower engine deck position of FIGS. 7-9, relative to the mower's frame.

Referring to FIGS. 5-12, the handle/pump control system or assembly includes vertically upright supports or weldments 14 which support the handle control assembly, rigid handle bar 32, right hand handle control member 100 which includes a front handle control lever 33 and a rear handle control lever 34 affixed to rotatable horizontal bar 35a, wherein the right hand levers 33 and 34 are adapted to be moved or gripped by a right hand of the mower operator (the right hand control member 100 and the levers 33-34 thereof control the speed and driving direction of the right rear drive wheel 43 of the mower), left hand handle control member 102 which includes a front handle control lever 33 and a rear handle control lever 34 affixed to rotatable horizontal bar 35b, wherein the left hand levers 33 and 34 are adapted to be moved or gripped by a left hand of the mower operator (the left hand control member 102 and the levers 33-34 thereof control the speed and driving direction of the left rear drive wheel 43 of the mower), right hand control rod 104 which is oriented substantially vertically and whose up/down movement in direction "b" (see "b" in FIG. 5) is caused by pivoting of the levers 33-34 of the right hand control member 100 in direction "a" (see "a" in FIG. 5) about the axis of bar 35a, similar left hand control rod 106 which is oriented substantially vertically (i.e., vertically plus/minus about 20 degrees in any direction) and whose up/down movement in direction "b" (see "b" in FIG. 6) is caused by pivoting of the levers 33-34 of the left hand control member 102 about the axis of bar 35b, elongated hinges 108 on both the right and left hand sides of the mower, static upper hinge swivel points 110, 112 for each of the two hinges 108, crossing torsion rods 114 and 116 where right wheel torsion rod 114 rotates in direction "f" (see "f" in FIG. 5) controls the right rear drive wheel 43 of the mower and is rotated when right hand levers 33-34 of right hand control 100 are pivoted and left wheel torsion rod 116 controls the left rear drive wheel 43 of the mower and is rotated when left hand levers 33-34 of left hand control 102 are pivoted, floating (floating relative to the mower's frame) lower hinge swivel points 118, 120 for each of the two hinges 108 which permit the torsion bars to pivot/swivel relative to the lower portions of the hinges, hydraulic (or hydro) pump 122 for controlling the right rear drive wheel 43 of the mower (but located on the left side of the engine deck 31), a similar hydraulic pump (see 123 in FIG. 6) positioned over hole 124 in the engine deck 31 for controlling the left rear drive wheel 43 of the mower (but located on the right side of the engine deck 31), pump control lever 126 for pump 122 that controls the right rear drive wheel 43 and pivots about pump pivot point 127, pump control lever 128 for the other pump 123 that controls the left rear drive wheel 43, substantially vertically oriented pump control rods 126a and 128a which move up/down in direction "g" for the corresponding pumps and which are pivotally attached to the pump levers 126, 128, floating pump control rod swivel points 130 at upper portions of the pump control rods 126a, 128a, and static swivel points 132 about which levers 134 pivot.

Direction "e" in FIG. 5 depicts substantially horizontal movement of the torsion bar 114 and the bottom of hinge 108 as the engine deck 31 (and the engine, and pump 122) move up/down relative to the mower's frame via the deck lift system. In this same respect, "c" and "d" in FIG. 5 depict rotation or pivoting of the hinge 108 at a top portion thereof relative to the vertical support 14 thereby allowing the bottom portion of the hinge 108 to move in direction "e" thus permitting the system to compensate for up/down movement of the engine deck, pumps and engine via the deck lift system. FIG. 5 illustrates the control system for the right rear drive wheel 43, for purposes of simplicity; and the control system for the left rear drive wheel 43 is identical to that shown in FIG. 5 except that the respective parts are on the other side (e.g., right vs. left, or vice versa) of the mower. FIG. 6 illustrates only parts of the control system for the left rear drive wheel 43, again for purposes of simplicity.

The right hand levers 33-34 pivot independently from the left hand levers 33-34. In other words, movement of the right hand levers 33-34 does not result in movement of the left hand levers 33-34. It is noted that rotating cross bar 35 includes first and second sections 35a and 35b which are axially aligned but rotate independently of one another, the first section 35a rotating with the right hand levers 33-34 and the second section 35b rotating with the left hand levers 33-34. Thus, the right and left hand control rods 104 and 106 also move up/down independently of each other. While only one hydro pump 122 is shown in the FIG. 5, another hydro pump 123 (see FIG. 6) is mounted on the engine deck 31 over hole 124 in a similar manner for controlling the other drive wheel. Example hydraulic pumps are described in U.S. Pat. No. 6,782,797, the disclosure of which is hereby incorporated herein by reference. First and second hydraulic fluid hoses 140, 142 (see FIG. 6) extend between each pump 122, 123 and the motor that drives the corresponding rear drive wheel 43 of the mower, and for a given drive direction one of these hoses taking fluid to the motor from the pump, and the other hose taking fluid from the motor to the pump 122 (the pump flow directions change when the driving direction of the motor changes).

Accordingly, it will be appreciated that in the system of FIGS. 5-12, the right handle control 100 controls the right rear drive wheel 43, but the hydro pump 122 for this drive wheel is on the left side of the mower (i.e., on the opposite side of a conventional mower). In a similar manner, the left handle control 102 controls the left rear drive wheel 43, but the hydro pump 123 for this drive wheel is on the right side of the mower (i.e., on the opposite side of a conventional mower). The driving of the rear drive wheels by respective hydro pumps which are on the opposite sides of the mower than the wheels they drive is implemented by way of the use of torsion bars 114 and 116 that extend downwardly from the handles and "cross" each other to form an X as viewed from the front or rear of the mower (e.g., see FIGS. 7-8 and 10-11). The shape of the X formed by the crossing of the rotatable torsion bars 114 and 116 changes depending on the position of the engine deck 31 (and thus the pumps supported by the engine deck, and the cutter deck) (e.g., whether the engine deck is in a raised or lowered position as determined by the deck lift system); compare the X shown in FIGS. 7-8 where the engine deck 31 is in a fairly low position versus the X shown in FIGS. 10-11 where the engine deck 31 is in a higher position relative to the mower frame and weldment/support 14. In other words, the angles of the torsion bars relative to the vertical and horizontal change as a function of the height of the engine deck 31. The angles of both torsion bars 114 and 116 change together when the engine deck 31 is raised/lowered because the bottom ends of both torsion bars are operatively associated with, or attached indirectly, to the engine deck 31. In other words, for each torsion bar 114 and 116, the pivots at the upper end of the torsion bar changes elevation with respect to the pivots at the lower end of the torsion bar when the deck 31 is raised/lowered via the deck lift system. Thus, the hand controls 32-34 and pumps 122, 123 can move vertically relative to one another, and the system is able to accommodate height change and still transmit the motion proportional to hand levers to control the pumps. In certain example embodiments, the pump levers 126 and 128 face opposite directions (so as to control one pump from the back and one from the front), thereby allowing one torsion bar to be located ahead of the other torsion bar.

This X (i.e., the crossing of the torsion bars for the respective pumps 122 and 123) permits the system to avoid the use of flexible cables in a system where the engine deck can be raised/lowered relative to the frame and handle controls. This is advantageous because flexible cables can be inefficient with respect to transmitting motion, and can introduce inefficiencies into the system.

Referring especially to FIGS. 5-12, an example operation of the steering/pump control system will now be described. When an operator of the mower pulls backward on either of levers 33, 34 of the right hand drive wheel control 100 shown in FIG. 5, the right hand control 100 (including levers 33, 34 which move together) pivots/rotates clockwise about a horizontal axis defined by bar 35a ("clockwise" is determined as viewed from the port side of the mower—namely from the viewpoint shown in FIG. 5). Such pulling backward on lever 33 and/or 34 of right rear drive wheel control 100 causes the right rear drive wheel to either reduce its forward speed, or to start movement in reverse or increase speed in reverse (in a similar manner, pushing forward on lever 33 and/or 34 of the right rear drive wheel control 100 causes the right rear drive wheel to either increase forward speed, or reduce reverse speed). When levers 33, 34 is/are pulled back and the right rear drive wheel control 100 rotates clockwise in direction "a" as shown in FIG. 5, this causes right hand control rod 104 to move upwardly in direction "b" due to the pivotal connection at 101 between the control 100 and rod 104. When right hand control rod 104 moves upwardly in direction "b", this causes torsion bar 114 to rotate counterclockwise about its own elongate axis in direction "f" shown in FIG. 5 (again, counterclockwise is determined as viewed from the port side of the mower). This counterclockwise rotation/pivoting of torsion bar 114 in turn causes lever 134 connected thereto to pivot counterclockwise about a horizontal axis defined at 132 which causes the lever 134 to raise pump control rod 126a vertically in direction "g." This rising of the pump control rod 126a causes the pump control lever 126 to pivot counterclockwise about the pump's axis 127 thereby controlling the pump 122 to either cause the right rear drive wheel 43 to reduce its forward speed, or to start movement of the wheel in reverse or increase its speed in reverse. Hoses (e.g., see hoses 140, 142 in FIG. 6) from the pump 122 control the wheel motor of the right rear drive wheel 43 in a known manner. Movement forward of the levers 33-34 causes the components to move in the opposite directions described. Moreover, the control system of the left rear drive wheel (e.g., see FIG. 6) functions in a similar manner.

The example embodiment illustrated in FIGS. 5-12 utilizes torsion bars 114 and 116 that cross and form a variable "X" when viewed from the rear and/or front of the mower. However, this invention is not so limited. In other example embodiments, the torsion bars 114, 116 may still form an angle of from about 10 to 50 degrees with the horizontal as in the FIG. 5-12 embodiment, but instead extend fore/aft within the footprint of the mower (instead of left-right across the width of the mower) in which case the rotatable torsion bars need not cross each other when viewed from the front or rear of the mower.

In the example non-limiting embodiment discussed above, the left pump controls the right drive wheel, and the right pump controls the left drive wheel. However, this invention is not so limited. According to an alternative embodiment of this invention, movement of the right control 100 could cause vertical movement of the left control rod 106, while movement of the left control 102 causes movement of the right control rod 104. The same torsion bars and so forth would still be used. In this alternative embodiment, this would permit the left pump to control the left drive wheel, and the right pump to control the right drive wheel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A lawn mower comprising:
   at least one cutting blade for cutting grass;
   a right rear drive wheel and a left rear drive wheel;
   an engine deck supporting an engine that drives the at least one blade for cutting grass, the engine deck also supporting a first hydraulic pump that controls the right rear drive wheel and a second hydraulic pump that controls the left rear drive wheel;
   a deck lift system for raising/lowering the engine deck relative to both a frame of the mower and a handle control assembly, the handle control assembly for allowing an operator of the mower to steer the mower by controlling the right and left rear drive wheels independent of one another;
   wherein the first hydraulic pump that controls the right rear drive wheel is located on a left half portion of the engine deck, and the second hydraulic pump that controls the left rear drive wheel is located on a right half portion of the engine deck; and
   wherein a first linkage between a right hand control member and the first hydraulic pump includes a first rotatable torsion bar, and a second linkage between a left hand control member and the second hydraulic pump includes a second rotatable torsion bar, and wherein the first and second torsion bars cross one another so as to form an X when viewed from a rear and/or front of the mower.

2. The mower of claim 1, wherein an end of the first torsion bar is supported by a first substantially vertically extending hinge, and an end of the second torsion bar is supported by a second substantially vertically extending hinge, and wherein upper ends of the first and second hinges are pivotally attached to respective substantially vertically oriented supports that are affixed to or are part of the frame of the mower.

3. The mower of claim 1, wherein the first and second torsion bars each form an angle of from about 10 to 50 degrees relative to the horizontal for at least one location of the engine deck.

4. The mower of claim 1, wherein angles formed between the first and second torsion bars in the X vary as a function of the elevation of the engine deck relative to the frame of the mower.

5. The mower of claim 1, wherein the deck lift system lifts and lowers together the engine deck, engine, a cutter deck, and the pumps of the mower.

6. The mower of claim 1, further comprising a foot platform for supporting feet of an operator who may operate the mower from a standing position.

7. The mower of claim 1, further comprising a seat for supporting an operator of the mower.

8. The mower of claim 1, wherein the mower is a zero turning radius mower capable of performing zero radius turns.

9. A zero turning radius lawn mower comprising:
   at least one cutting blade for cutting grass;
   a right rear drive wheel and a left rear drive wheel;
   an engine deck supporting an engine that drives the at least one blade for cutting grass, the engine deck also supporting a first hydraulic pump that controls the right rear drive wheel and a second hydraulic pump that controls the left rear drive wheel so that the mower is a zero turning radius mower capable of performing zero radius turns via the right and left rear drive wheels;
   a deck lift system comprising a deck lift lever for raising/lowering the engine deck relative to both a frame of the mower and a handle control assembly, the handle control assembly including first and second upright supports and a plurality of steering levers for allowing an operator of the mower to steer the mower by controlling the right and left rear drive wheels independent of one another;
   wherein the first hydraulic pump that controls the right rear drive wheel is located on a left half portion of the engine deck, and the second hydraulic pump that controls the left rear drive wheel is located on a right half portion of the engine deck; and
   wherein a first linkage between a right hand control member and the first hydraulic pump includes a first rotatable torsion bar, and a second linkage between a left hand control member and the second hydraulic pump includes a second rotatable torsion bar, and wherein the first and second torsion bars cross one another so as to form an X when viewed from a rear and/or front of the mower.

10. The mower of claim 9, wherein an end of the first torsion bar is supported by a first substantially vertically extending hinge, and an end of the second torsion bar is supported by a second substantially vertically extending hinge, and wherein upper ends of the first and second hinges are pivotally attached to respective substantially vertically oriented supports that are affixed to or are part of the frame of the mower.

11. The mower of claim 9, wherein the first and second torsion bars each form an angle of from about 10 to 50 degrees relative to the horizontal for at least one location of the engine deck.

12. The mower of claim 9, wherein angles formed between the first and second torsion bars in the X vary as a function of the elevation of the engine deck relative to the frame of the mower.

13. The mower of claim 9, wherein the deck lift system lifts and lowers together the engine deck, engine, a cutter deck, and the pumps of the mower.

14. The mower of claim 9, further comprising a foot platform for supporting feet of an operator who may operate the mower from a standing position.

15. The mower of claim 9, further comprising a seat for supporting an operator of the mower.

* * * * *